US006514598B1

(12) United States Patent
Totani et al.

(10) Patent No.: US 6,514,598 B1
(45) Date of Patent: Feb. 4, 2003

(54) INK JET RECORDING SHEET AND METHOD

(75) Inventors: Kazuo Totani, Tokyo (JP); Naonobu Sugiyama, Nishinomiya (JP); Satoshi Matsuura, Chiba (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 09/422,716

(22) Filed: Oct. 22, 1999

(30) Foreign Application Priority Data

Oct. 27, 1998 (JP) ........................................... 10-305193

(51) Int. Cl.[7] ............................ B32B 27/14; B32B 3/00

(52) U.S. Cl. ....................... 428/195; 428/206; 428/327; 428/500

(58) Field of Search ................................. 428/327, 195, 428/206, 323, 500

(56) References Cited

U.S. PATENT DOCUMENTS

| | | | | |
|---|---|---|---|---|
| 4,877,678 A | | 10/1989 | Hasegawa et al. | |
| 5,352,736 A | | 10/1994 | Stofko, Jr. et al. | |
| 5,576,088 A | * | 11/1996 | Ogawa et al. | 428/327 |
| 5,804,320 A | * | 9/1998 | Tomioka et al. | 428/478.2 |
| 5,989,378 A | * | 11/1999 | Liu et al. | 156/241 |

FOREIGN PATENT DOCUMENTS

| | | |
|---|---|---|
| JP | 55-5183 | 1/1980 |
| JP | 56-148585 | 11/1981 |
| JP | 62259882 | 11/1987 |
| JP | 9-132740 | 5/1997 |
| JP | 9-157559 | 6/1997 |

* cited by examiner

*Primary Examiner*—Cynthia H. Kelly
*Assistant Examiner*—B. Shewareged
(74) *Attorney, Agent, or Firm*—Arent Fox Kintner Plotkin & Kahn

(57) ABSTRACT

An ink jet recording sheet, capable of recording pigment ink images having an excellent resistance to rough handling and a high weather resistance and thus being useful for advertisement sheets, has a polymeric film support, a lower ink receiving layer containing a water-insoluble polymeric material and amorphous synthetic silica particles and formed on the support directly or through an undercoat layer, and an upper ink receiving layer containing a water-insoluble polymeric material, amorphous synthetic silica particles and a silanol-modified polyvinyl alcohol, and exhibiting a Bekk smoothness of 5 to 40 seconds.

6 Claims, No Drawings

INK JET RECORDING SHEET AND METHOD

BACKGROUND OF THE INVENTION

1. Field of the Invention

The present invention relates to an ink jet recording sheet and method. More particularly, the present invention relates to an ink jet recording sheet usable for ink jet printer using a coloring pigment ink, and having an excellent colored image-receiving property, a high resistance of an ink receiving surface thereof to abrasion and a high water resistance of the coated layers, and a ink jet recording method using the recording sheet.

2. Description of the Related Art

Due to the technical progress in ink jet printers for preparing colored hard copies at a high speed, it has become possible to obtain clear images and excellent print quality. With this progress, an ink jet recording material having more enhanced properties has been demanded to further improve the quality and saturation of print and the appearance of the recording material and the images. Particularly, due to the enhancement of the printing speed, the resolution power and saturation of the images, further improved properties such as a high ink-drying rate, a high-absorption capacity, a uniform dot size and a blotting control are required, and thus various improved recording materials have been developed. Japanese Unexamined Publications No. 55-5,183 and No. 56-148,585 disclose an ink jet recording material having an ink receiving layer formed on a substrate material and comprising a porous inorganic pigment.

Also, the use of recent ink jet printers has expanded from the conventional document-printing to large width advertisement-printing, for example, poster-printing. Since the ink jet printer is advantageous in that the printing operation is very simple and no printing plate must be prepared before printing and thus the prints can be made even in a small numbers, necessary images or letters can be quickly printed in a necessary number in response to demand. Also, for the printing of advertisement sheets, a plotter which can print sheets having a large width is usually employed. The plotter is required to be capable of printing clear pictures or images which have a large width appropriate for advertisements, can be clearly observed even from for away and can maintain a high clarity of the pictures or images over a long period. Usually, the ink for the ink jet printing contains a dye as a coloring material. The dye exhibits a relatively poor resistance to oxidation due to ultra-violet rays or ozone and thus the color of the printed images is relatively easily faded when exposed to the atmosphere and sunlight over long period, and the appearance of the pictures or images is degraded. To solve the above-mentioned problem, Japanese Unexamined Patent Publications No. 9-157,559 and No. 9-132,740 disclose use of a pigment ink having a higher light fastness than that of the dye ink for the plotter. When the ink containing a dye, which is constituted by a low molecular weight compound, is employed, the dye molecules in the printed images are chemically and/or physically absorbed in, or bound to, the ink receiving layer. Compared with this, when the ink containing a pigment is used, the particles of the pigments are put or placed imagewise and side by side on the surface of the ink receiving layer. Therefore, when an ink jet recording sheet appropriate for the dye ink is printed with a pigment ink, and the resultant pigment images are rubbed with a finger, the pigment ink images are easily removed and thus are insuitable in practice. The pigment ink is advantageous in that the recorded pigment images exhibit excellent resistance to fading and water and thus have a superior durability to storage over a long period. However, in the conventional ink jet recording sheet, the ink receiving layer has a low resistance to water. Thus, when the printed ink jet recording sheet is exposed outdoors, the ink receiving layer of the ink jet recording sheet is deteriorated by rainwater or muddy water and thus cannot be employed over a long period.

SUMMARY OF THE INVENTION

An object of the present invention is to provide an ink jet recording sheet, appropriately usable for printers or plotters using pigment inks, having an ink receiving layer with a high water resistance and capable of recording ink images good qualities, such as, for example, a high color density, a high clarity, a high resistance to rubbing, at a high recording speed.

Another object of the present invention is to provide an ink jet recording sheet, appropriate for applying pigment inks thereto, capable of recording thereon pigment images having high resistances to water and fading and a satisfactory clarity, and useful as a weather-resistant advertisement sheet outdoors and over a long period.

The ink jet recording sheet can be used for an ink jet recording method using a coloring pigment ink.

The above-mentioned objects can be attained by the ink jet recording sheet of the present invention which comprises (A) a support sheet comprising a polymeric film;

(B) a lower ink receiving layer formed on the support sheet and comprising amorphous synthetic silica particles and a water-insoluble polymeric material, and (C) an upper ink receiving layer formed on the lower ink receiving layer and comprising amorphous synthetic silica particles, a water-insoluble polymeric material and a silanol-modified polyvinyl alcohol, the upper ink receiving layer exhibiting a Bekk smoothness of 5 to 40 seconds, determined in accordance with Japanese Industrial Standard P 8119-1976.

In the ink jet recording sheet of the present invention as defined above, preferably, in the lower ink receiving layer, the water-insoluble polymeric material is present in an amount of 20 to 50 parts by weight per 100 parts by weight of the total weight of the lower ink receiving layer; and, in the upper ink receiving layer, the water-insoluble polymeric material is present in an amount of 5 to 20 parts by weight and the silanol-modified polyvinyl alcohol is present in an amount of 10 to 40 parts by weight, each per 100 parts by weight of the total amount of the upper ink receiving layer.

In the ink jet recording sheet of the present invention, the upper ink receiving layer optionally further comprises a cationic polymeric material.

In the ink jet recording sheet of the present invention, optionally, an undercoat layer comprising a pigment and a water-insoluble polymeric material is formed between the support sheet and the lower ink receiving layer.

In the ink jet recording sheet of the present invention, the amorphous synthetic silica particles contained in the upper ink receiving layer preferably have an average particle size of 6 to 16 $\mu$m.

In the ink jet recording sheet of the present invention, the Bekk smoothness of the upper ink receiving layer is preferably in the range of from 5 to 15 seconds.

The ink jet recording method of the present invention comprises jetting imagewise ink droplets comprising a coloring pigment toward the upper ink receiving layers of the ink jet recording sheet of the present invention to record colored ink images in the upper and lower ink receiving layers of the ink jet recording sheet.

The ink jet recording method of the present invention optionally further comprises laminating the ink jet-recorded surface of the ink jet recording sheet with a transparent synthetic resin film.

DESCRIPTION OF THE PREFERRED EMBODIMENTS

The ink jet recording sheet of the present invention suitable for the pigment ink jet printing comprises (A) a support sheet comprising a polymeric film; (B) a lower ink receiving layer formed on a surface of the support sheet and comprising amorphous synthetic silica particles and a water-insoluble polymeric material and (C) an upper ink receiving layer formed on the lower ink receiving layer, comprising amorphous synthetic silica particles, a water-insoluble polymeric material and a silanol-modified polyvinyl alcohol, and exhibiting a Bekk smoothness of 5 to 40 seconds, determined in accordance with JIS P 8119-1976.

In the ink jet recording sheet of the present invention, the lower and upper ink receiving layers constitute together a composite ink receiving layer.

In the pigment ink jet recording sheet of the present invention, to improve the water resistance of the ink receiving layer, a water-insoluble resin is used as a binder for the ink receiving layer. However, when an ink jet recording procedure is carried out by using an ink containing, as a coloring material, coloring pigment particles, the pigment ink droplets applied to the ink receiving layer containing the water-insoluble resin are repelled or shed by the ink receiving layer surface and therefore the resultant ink dots have a decreased size, non-colored (white) areas are formed between the size-decreased ink dots, and as a result, the resultant ink images exhibit a reduced color density. The color density of the ink images can be increased by decreasing the content of the water-insoluble resin in the ink receiving layer. However, the resultant ink receiving layer exhibits a reduced water resistance and is difficult to use in practice.

Also, the pigment ink jet recording system is disadvantageous in that, since the coloring component of the ink consists of solid pigment particles and the solid pigment particles are carried on the printed ink receiving layer surface, the resultant pigment ink images are easily removed from the ink receiving layer surface by rubbing the images with finger. Namely, the easy removal of the ink images, which is considered not to occur when the conventional dye ink is used, is an important problem to be solved in the pigment ink jet recording system.

The inventors of the present invention have made an extensive research on the water resistance of the ink receiving layer, the color density of the recorded images, the definition of the images and the rubbing resistance of the images, and as a result, have found that the water resistance of the ink receiving layer can be enhanced without decreasing the color density of the ink images recorded on the ink receiving layer by successively laminating a plurality of ink receiving layer containing a specific type of resin in a specific content on each other, and the rubbing resistance of the printed images can be enhanced by forming a recording surface having a specific structure. The present invention was completed based on the above-mentioned finding.

In the ink jet recording sheet of the present invention, the surface of the upper ink receiving layer must exhibit a Bekk smoothness of 5 to 40 seconds, preferably 5 to 25 seconds, more preferably 5 to 15 seconds, determined in accordance with Japanese Industrial Standard (JIS) P 8119-1976 (Testing method for smoothness of paper and paperboard by Bekk tester).

The reasons for the fact that the upper ink jet recording layer surface of the present invention having a Bekk smoothness in the above-mentioned range causes the resultant pigment ink images received thereon to exhibit a high definition and an excellent resistance to rubbing are not fully clear. However, the reasons are assumed to be as follows.

Since the coloring component of the pigment ink consists of a plurality of solid pigment particles each having a volume, the coloring component substantially cannot enter into the inside of the ink receiving layer which has a fine porous structure. Therefore, the printed pigment particles are located in the surface portion of the upper ink receiving layer. The coloring pigment particles are weakly bonded to each other through a binder contained in the ink vehicle and/or by a Van der Waals force between the coloring pigment particles, and thus the pigment images are easily removed by rubbing with a finger. Therefore, the pigment ink images must be carefully handled. Namely the pigment ink images exhibit a very poor handling property. In the present invention, however, by controlling the Bekk smoothness of the upper ink receiving layer to a level of 40 seconds or less, determined in accordance with JIS P 8119, the upper ink receiving layer surface has an appropriate roughness, thus the pigment ink images are firmly fixed onto the upper ink receiving layer surface and exhibit an increased resistance to rubbing. Preferably, the Bekk smoothness of the upper ink receiving layer surface is controlled to 25 seconds or less, more preferably 15 seconds or less, determined in accordance with JIS P 8119. When the Bekk smoothness of the upper ink receiving layer is 15 seconds or less, the phenomenon that the pigment ink images formed on the upper ink receiving layer surface are removed by rubbing with finger can be completely prevented.

When the Bekk smoothness of the upper ink receiving layer is less than 5 seconds, the form of the ink dots are irregularly strained. When pigment ink is printed on the upper ink receiving layer having a Bekk smoothness of less than 5 seconds, to form images having a half tone like a human skin tone, the ink dots are irregularly strained in a roughened skin tone and thus minute and fine ink images cannot be formed. It should be noted that, in the conventional ink jet recording sheets, the recording surfaces usually have a high smoothness, and thus this type of recording sheets are disadvantageous in that when printed with pigment inks, the resultant ink images are easily removed by rubbing.

The amorphous synthetic silica particles usable for the upper and lower ink receiving layers of the present invention can be produced by preparing sodium silicate from quartz sand having a high degree of purity; by mixing the sodium silicate with sulfuric acid to provide a silicic acid sol; and by converting the silicic acid sol to a three dimensional agglomerate of fine primary silica particles, and optionally by stopping the growth of the agglomerate by controlling the reaction temperature and the ion content or by adding a surfactant.

The composite ink receiving layer of the present invention consists of lower and upper ink receiving layer. The upper ink receiving layer, onto which the ink droplets are applied imagewise, contains amorphous synthetic silica particles which are secondary agglomerate particles and preferably have an average particle size of 6 μm or more but not more than 16 μm. When the average agglomerate particle size is less than 6 μm, the resultant ink receiving layer may have too high a density, and thus the absorption rate of the ink by the ink receiving layer may be too small, and when a plurality of ink droplets are successively applied to the upper ink receiving layer, the applied ink droplets may be mixed with each other before the applied ink droplets are absorbed by the upper and lower ink receiving layers, so as to form blotted ink images on the upper ink receiving layer surface. Also, the amorphous synthetic silica particles having an average secondary agglomerate particles of less than 6 μm may cause the resultant upper ink receiving layer surface to exhibit Bekk smoothness of more than 40 seconds and thus the resultant ink images may exhibit an unsatisfactory rubbing resistance. There is no limitation to the method of measuring the agglomerate particle size of the synthetic silica. For example, the agglomerate particle size can be measured by a Coulter counter.

Particularly, in a wide format plotter, when the amount of the applied ink is large, for example, 30 to 40 g/m$^2$, and the upper ink receiving layer exhibits an insufficient ink-absorbing rate, the applied ink droplets remain on the upper ink receiving layer surface until the ink droplets are absorbed in the layer and are mixed with adjacent another droplets to form blotted ink images or color-mixed ink images. However, the blotting of the ink images can be prevented by controlling the average size of the amorphous synthetic silica particles to 6 μm or more.

Also, when the average agglomerate particle size is more than 16 μm, although the resultant upper and lower ink receiving layers may exhibit a satisfactory ink-absorbing rate, the ink may easily penetrate into the gaps formed between the silica particles and thus the resultant ink image may exhibit an unsatisfactory color density. Further, the resultant upper ink receiving layer may exhibit a Bekk smoothness of less than 5 seconds determined in accordance with JIS P 8119, and in this case, the dots of the printed ink images may be in a strained irregular form, and thus the ink images having a high definition cannot be obtained. The amorphous synthetic silica particles for the upper ink receiving layer may be prepared by mixing two or more types of amorphous synthetic silica particles different in particle size from each other and by controlling the average agglomerate particle size of the mixed particles to a level of 6 μm or more but not more than 16 μm.

In the ink jet recording sheet of the present invention, the upper and lower ink receiving layers are not always necessary to be the same in the average agglomerate particle size of the amorphous synthetic silica particles as each other and the average particle sizes of the amorphous synthetic silica particles contained in the upper and lower ink receiving layers may be appropriately established unless the objects of the present invention are attained.

Also, the upper and lower ink receiving layers may contain, in addition to the amorphous synthetic silica particles, additional pigment particles, for example, to improve the coating aptitude of the coating liquids for the upper and lower ink receiving layers, as long as the additional pigment particles do not affect on the high color density and definition of the ink images which must be attained by the present invention.

The additional pigment usable for the upper and lower ink receiving layers of the present invention is preferably selected from inorganic pigments different from the amorphous synthetic silica, for example, calcium carbonate, clay, calcined clay, diatomaceous earth, talc, aluminum oxide, magnesium aluminosilicate, magnesium carbonate, barium sulfate, zinc oxide, aluminum hydroxide and magnesium hydroxide; and organic pigments, for example, styrene homopolymer and copolymer pigments and acrylic acid ester homopolymer and copolymer pigments.

The above-mentioned additional pigments may be employed alone or in a mixture of two or more thereof. The upper and lower ink receiving layers optionally contain a cationic polymeric material which contributes to enhancing the color density and the clarity of the images and to preventing the blotting of the ink images. Particularly, the cationic polymeric material is preferably contained in the upper ink receiving layer.

The cationic polymeric material usable for the upper and lower ink receiving layers of the present invention include polyethyleneimine, polyvinyl pyridine polydialkylaminoethyl methacrylate, polydialkylaminoethyl acrylate, polydialkylaminoethyl methacrylamide, polydialkylaminoethyl acrylamide, polyepoxyamine, polyamideamine, dicyandiamide-formaldehyde polycondensation products, dicyandiamidepolyalkyl-polyalkylenepolyamine polycondensation products, polydiallyldimethyl ammonium salt, polyvinylamine and polyallylamine, and modification products of the above-mentioned compounds.

There is no limitation to the content of the cationic polymeric material in each ink receiving layer. Usually, the content of the cationic polymeric material in each of the upper and lower ink receiving layer is 3 parts by weight or more but not more than 30 parts by weight per 100 parts by weight of the total weight of each layer. When the content of the cationic polymeric material is less than 3 parts by weight, the enhancement effect on the resistance of the resultant ink receiving layer to the blotting of the ink images may be insufficient. Also, when the content is more than 30 parts by weight, although the color density of the resultant ink images may be enhanced, the ink-drying property of the resultant ink receiving layer may decrease.

In the upper ink receiving layer of the present invention, the water-insoluble polymeric material, i.e. the water-dispersible polymer resin, is preferably contained in an amount of 5 parts by weight or more but not more than 20 parts by weight, per 100 parts by weight of the total weight of the upper ink receiving layer. In the above-mentioned content of the water-insoluble polymeric material, the resultant upper ink receiving layer exhibits an enhanced adhesion to the lower ink receiving layer and the composite ink receiving layer consisting of the upper and lower ink receiving layers exhibits an enhanced water resistance.

When the content of the water-insoluble polymeric material is less than 5 parts by weight, the resultant upper ink receiving layer may exhibit an insufficient adhesion to the lower ink receiving layer and the resultant two-layered composite ink receiving layer may exhibit an unsatisfactory water resistance. Also, when the water-insoluble polymeric material content is more than 20 parts by weight, the ink droplets jetted toward the resultant upper ink receiving layer may be repelled by the recording surface of the layer, the resultant ink dots may have a decreased size, and the resultant ink images may exhibit a reduced color density.

The water-insoluble polymeric material usable for the upper and lower ink receiving layers may comprise at least one member selected from conjugated diene polymer latices, for example, styrene-butadiene copolymeric latices, methyl methacrylate-butadiene copolymer latices, acrylic ester polymer latices, for example, latices of homopolymer and copolymers of acrylate esters and methacrylate esters, and vinyl compound homopolymer and copolymer latices, for example, latices of vinyl acetate copolymers.

The above-mentioned water-insoluble polymers and copolymers are employed alone or in a mixture of two or more thereof.

The upper ink receiving layer optionally further contains a silanol-modified polyvinyl alcohol which causes the ink dots received on the upper ink receiving layer to have an increased dot size to enhance the color density of the ink images, and the resultant upper ink receiving layer per se to exhibit an enhanced mechanical strength. Preferably, the silanol-modified polyvinyl alcohol is contained in an amount of 10 parts by weight or more but not more than 40 parts by weight per 100 parts by weight of the total solid weight of the upper ink receiving layer.

The reasons for the enhancement of the color density of the ink images due to the silanol-modified polyvinyl alcohol added into the upper ink receiving layer are not completely clear. The reasons are assumed to be as follows.

The silanol modified polyvinyl alcohol is prepared by copolymerizing lower aliphatic monocarboxylic acid-vinyl ester, for example, vinyl acetate, with a silanol group-containing alkylene monomer by a radical polymerization method, and then by saponifying the resultant copolymer. The resultant silanol-modified polyvinyl alcohol has hydroxyl groups having a high polarity, and thus exhibits a high hydrophilicity. However, the silanol groups contained in the polymer molecules exhibit a high reactivity and intermolecularly and intramolecularly bond with one another to form strong cross-linkages. Therefore, the resultant silanol-modified polyvinyl alcohol is difficult to dissolve in cold water. Namely, the silanol-modified polyvinyl alcohol is substantially insoluble in cold water in spite of the high hydrophilicity thereof. Therefore, the silanol-modified polyvinyl alcohol is not swollen by the ink and can absorb the ink by a capillary phenomenon generated due to fine pores formed by the amorphous synthetic silica particles and the silanol-modified polyvinyl alcohol. Therefore, when the silanol-modified polyvinyl alcohol particles are contained, together with the amorphous synthetic silica particles, in the upper ink receiving layer, the ink droplets jetted toward and received on the upper ink receiving layer spread in all directions by the capillary phenomenon due to the above-mentioned fine pores, and the resultant ink dots have an increased size and the ink images exhibit an enhanced color density.

When the silanol-modified polyvinyl alcohol is contained in a content of less than 10 parts by weight, the resultant upper ink receiving layer has a decreased content of the binder and thus may exhibit an insufficient coating strength and an undesirable powdering phenomenon may occur in the upper ink receiving layer. Also, when the content of the silanol-modified polyvinyl alcohol is more than 40 parts by weight, the ink dots may be formed in too large a size and the ink images may be blotted.

The silanol-modified polyvinyl alcohol useable for the present invention preferably has a degree of polymerization of 500 or more but not more than 2000. If the polymerization degree is less than 500, the resultant upper ink receiving layer may exhibit an insufficient mechanical strength. If the polymerization degree is more than 2000, the silanol-modified polyvinyl alcohol may cause the coating liquid for the upper ink receiving layer to exhibit too high a viscosity and an unsatisfactory coating applicability.

In each of the upper and lower ink receiving layers, a water-soluble polymeric material is optionally contained to enhance the applicability of the coating liquid for the layer, as long as the water-soluble polymeric material does not affect on the quality of the ink jet recording sheet.

The water-soluble polymeric material usable for the present invention includes polyvinyl alcohol, polyvinyl alcohol derivatives, for example, cation-modified polyvinyl alcohols, proteins, for example, casein, starch, starch derivatives, for example, oxidized starch, polyvinyl pyrrolidone, cellulose derivatives, for example, carboxymethyl cellulose, and other water-soluble polymeric binders.

The above-mentioned water-soluble polymeric materials may employed alone or in a mixture of two or more thereof.

The upper and lower ink receiving layers optionally further comprise at least one member selected from pigment-dispersing agents, anti-foaming agents, viscosity-regulaters, cross-linking agents, and fluorescent dyes, in consideration of the producing conditions and the necessary properties of the recording sheet.

The lower ink receiving layer of the present invention formed on the support sheet comprises a water-insoluble polymeric material and amorphous synthetic silica particles and optionally a cationic polymeric material, pigment particles different form the amorphous synthetic silica particles and other additives. There is no limitation to the particle size of the amorphous synthetic silica particles in the lower ink receiving layer. Usually, the particle size is about 1 to 40 $\mu$m.

The lower ink receiving layer preferably contains the water-insoluble polymeric material in a content of 20 parts by weight or more but not more than 50 parts by weight, per 100 parts by weight of the total solid weight of the lower ink receiving layer, to improve the adhesion of the resultant lower ink receiving layer to the support sheet or an undercoat layer formed between the support sheet and the lower ink receiving layer and to enhance the water resistance of the interface between the lower ink receiving layer and the support sheet or the undercoat layer. When the content of the water-insoluble polymeric material is less than 20 parts by weight, the resultant lower ink receiving layer may exhibit an unsatisfactory water resistance. Also, the content of the water-insoluble polymeric material is more than 50 parts by weight, the resultant lower ink receiving layer may exhibit an insufficient ink-absorbing property, and the printed ink images may be blotted.

The upper and lower ink receiving layer may be formed by a conventional coating device, for example, a bar coater, an air knife coater, a blade coater, a die coater or a curtain coater.

The coating amount of each of the lower and upper ink receiving layers is established in response to the final use of the ink jet recording sheet, and should not be unnecessarily too large as long as the established coating amount renders the resultant layer to exhibit satisfactory ink-absorbing property, colored image-receiving property and mechanical strength of the layer.

The lower ink receiving layer of the present invention is preferably in an amount of 3 g/m$^2$ or more but not more than 10 g/m$^2$ by dry weight. When the layer amount is less than 3 g/m$^2$, the resultant lower ink receiving layer may exhibit an insufficient ink-absorption capacity and the resultant ink images may blot. Also, when the layer amount is more than 10 g/m$^2$, the coating strength of the resultant lower ink receiving layer may be insufficient.

The coating amount of the upper ink receiving layer of the present invention is established in consideration of the final use of the recording sheet, and should not be unnecessarily too large as long as the resultant layer exhibits satisfactory ink-absorbing property, colored image-forming property and coating strength. Preferably, the dry amount of the upper ink receiving layer is 3 g/$m^2$ or more but not more than 30 g/$m^2$. When the amount of the upper ink receiving layer is less than 3 g/$m^2$, the resultant layer may exhibit an unsatisfactory ink absorption capacity and thus the received ink droplets may spread and the ink images may be blotted and may exhibit an unsatisfactory clarity. Also, when the amount of the layer is more than 30 g/$m^2$, the resultant upper ink receiving layer may be too thick, and may exhibit an insufficient adhesion to the lower ink receiving layer, the surface of the upper ink receiving layer for receiving the pigment ink images may exhibit a reduced surface strength, and the cost for the upper ink receiving layer may be too high.

In the ink jet recording sheet of the present invention, optionally, an undercoat layer comprising a water-insoluble polymeric material is formed between the support sheet and the lower ink receiving layer, to enhance the adhesion therebetween and the water resistance of the ink jet recording sheet.

If the undercoat layer contains no water-insoluble polymeric material, and when a water-soluble polymeric material is contained as a principal component, the upper and lower ink receiving layers wetted with water, for example, rainwater may be easily removed by rubbing them. Even when a transparent polymeric film is laminated on the ink receiving layers to prevent the permeation of water into the ink receiving layers, it is unavoidable that water penetrate through the side edge faces of the lower and upper ink receiving layers. Where a water-soluble polymeric material, for example, a polyvinyl alcohol having a relatively low molecular weight is contained in the undercoat layer, and when the contact time of the ink receiving layer with water is relatively short, the polymeric material contained in the layer is dissolved in the water penetrated into the layer through the side edge faces of the layer to form a high viscosity liquid film on the side edge faces of the layer and thus to prevent the further penetration of water. However, where the ink jet recording sheet is exposed to rain for a long time, since the contact time of the layer with water is very long, the high viscosity film of the water-soluble polymeric material cannot sufficiently prevent the penetration of water, and as a result, the ink receiving layers are removed together with the transparent polymeric film from the support sheet.

Accordingly, in the case where the ink jet recording sheet must have a high water resistance, preferably an undercoat layer comprising a water-insoluble polymeric material is formed and optionally, a transparent polymeric film is laminated on the printed surface of the upper ink receiving layer.

The water-insoluble polymeric material usable for the undercoat layer preferably comprises at least one member selected from, for example, latices of conjugated diene polymers and copolymers, for example, styrene-butadiene copolymer latices and methyl methacrylate-butadiene copolymer latices, acrylic polymer and copolymer latices, for example, acrylate ester polymer and copolymer latices and methacrylate ester polymer and copolymer latices, vinyl polymer and copolymer latices, for example, vinyl acetate polymer and copolymer latices, latices of other water-insoluble polymers and copolymers, and latices of modified polymers and copolymers of the above-mentioned polymers and copolymers, having functional groups, for example, carboxyl and cationic groups. The water-insoluble polymers or copolymers may be employed alone or in a mixture of two or more thereof. The water-insoluble polymeric material is preferably employed in an amount of 10 to 100 parts by dry weight, more preferably 20 to 80 parts by dry weight, per 100 parts by dry weight of the undercoat layer.

The undercoat layer optionally contains a pigment in addition to the water-insoluble polymeric material. The pigment is preferably selected from inorganic pigments such as calcium carbonate, clay, calcined clay, diatomaceous earth, talc, aluminum oxide, silica, white carbon, magnesium alumino-silicate, magnesium carbonate, barium sulfate, titanium dioxide, zinc oxide, aluminum hydroxide, and magnesium hydroxide, and organic pigments (plastic pigments), for example, styrene homopolymer and copolymer pigments and acrylic acid ester homopolymer and copolymer pigments.

The pigments may be employed alone or in a mixture of two or more thereof.

The undercoat layer in the ink jet recording sheet of the present invention optionally contains a water-soluble polymeric materials to enhance the pigment-dispersing property and coating processability unless the water-resistance and mechanical strength of the undercoat layer are affected.

The water-soluble polymeric material for the undercoat layer preferably comprises at least one member selected from polyvinyl alcohol, polyvinyl alcohol derivatives, for example, silyl-modified polyvinyl alcohols, cation-modified polyvinyl alcohols, proteins, for example, casein, starch and starch derivatives, for example, oxidized starch. The water-soluble compounds may be employed alone or in a mixture of two or more thereof.

The undercoat layer optionally contains one or more additives selected from, for example, pigment-dispersing agents, anti-foam agents, viscosity modifiers and cross-linking agents, in response to the production conditions and the necessary performance.

The undercoat layer preferably has a water repellency of R6, or higher, determined in accordance with Japanese Industrial Standard (JIS) P 8137. In this case, the undercoat layer exhibits a high water-resistant property. When the water repellency is lower than R6, the resultant undercoat layer may not exhibit a high water-absorption, and thus a target high water resistance of the ink jet recording sheet may not be obtained.

There is no limitation to the coating method and device for forming the undercoat layer.

To form the undercoat layer on the support sheet, a conventional coating device, for example, a bar coater, an air knife coater, a blade coater, or a curtain coater may be used. The amount of the undercoat layer is established in consideration of the final use of the recording sheet and should not be unnecessarily too much as long as the resultant ink jet recording sheet exhibits satisfactory water resistance, ink jet recording property and storage durability. Preferably, the undercoat layer is formed in an amount of 0.2 g/$m^2$ or more but not more than 10.0 g/$m^2$.

When the amount of the undercoat layer is too small, the improvement effects on the adhesion of the support sheet to the lower ink receiving layer and on the water resistance of the recording sheet may be insufficient. If the amount of the undercoat layer is too much, fine circular defects may be formed on the surface of the composite ink receiving layer formed on the undercoat layer, and the resultant recording sheet may exhibit a deteriorated appearance.

The polymeric film usable for the support sheet of the ink jet recording sheet of the present invention is preferably selected from thermoplastic polymeric films, for example, polyester films and polyolefin films which contribute to enhancing the water resistance of the recording sheet. The polyester films include films, consisting of or comprising, as a principal component, at least one member selected from polyethylene terephthalate, polybutylene terephthalate and polycyclohexene terephthalate, and the polyolefin films include films consisting of or comprising as a principal component, at least one member selected from polyethylene, polypropylene, ethylene-propylene copolymer and ethylene-vinyl acetate copolymers. The polymeric film usable for the support sheet optionally contains at least one other polymer selected from, for example, polystyrene and (meth)acrylate ester polymers and copolymers, mixed in the polyester or polyolefin resin.

The polymeric film may be one oriented in longitudinal and/or transverse direction thereof. Also, the polymeric film may be a synthetic paper sheet having a plurality of fine pores formed in a polymeric film matrix and exhibiting a paper-like appearence. Further the polymeric film may be formed by mixing a thermoplastic resin with fine inorganic pigment particles, forming the resinous mixture into a film and monoaxially or diaxially orienting the non-oriented film to produce an oriented polymeric sheet having paper-like surface layers. In the present invention, the support sheet may be prepared by laminating two or more of the above-mentioned polymeric films or sheets on each other. The laminated film include two or three-layered films consisting of a core film layer and one or two paper-like surface layers, and three to five-layered films consisting of a core film layer one or two paper-like layers and one or two surface layers formed on the paper-like layers.

The film having the paper-like layer formed from the thermoplastic resin is known as a synthetic paper sheet. There is no limitation to the opacity of the polymeric film for the support sheet for the present invention.

The recording liquid (ink) applicable to the ink jet recording sheet of the present invention contains, as a coloring component, a coloring pigment. Namely, the recording liquid (pigment ink) is prepared by dispersing an inorganic and/or organic coloring pigment in an aqueous or non-aqueous liquid medium.

The organic coloring pigments include azo pigments, phthalocyanine pigments, peryline pigments, isoindolinone pigments, imidazolone pigments, pyranethrone pigments, and thioindigo pigments. The inorganic coloring pigments include carbon black, synthetic iron oxide yellow, transparent colcothar, titanium yellow, molybdate orange, cuprous oxide, cobalt blue and ultramarine pigments.

In dispersing the coloring pigments, various surfactants, low molecular weight dispersing agents and polymeric dispersing agents having hydrophilic groups and hydrophobic group are used as dispersing agent.

The pigment ink is usually prepared by a procedure in which a coloring pigment and a dispersing agent are mixed into a medium; the mixture is subjected to a dispersing procedure using a dispersing machine, for example, a paint shaker or sand mill, to finely pulverize the pigment particles and uniformly disperse the fine coloring pigment particles in the liquid medium; and the resultant dispersion is filtered through a filter having a hole size of 1.0 μm or less to remove coarse particles.

After ink jet-printing with the pigment ink, the printed surface of the ink jet recording sheet of the present invention is optionally over-laminated with a transparent sheet. The transparent sheet for the over-lamination is prepared by coating a adhesive agent on a surface of a transparent sheet. The transparent sheet is preferably selected from transparent polyolefin films, for example, polyethylene or polypropylene films, transparent polyester films, for example, polyethylene terephthalate films and transparent vinyl polymer films, for example, polyvinyl chloride films.

The transparent sheet preferably has a thickness of 30 to 200 μm, more preferably 50 to 150 μm. When the thickness is too low, the resultant sheet is difficult to evenly laminate on the printed surface of the recording sheet without forming wrinkles. Also, when the thickness is too high, the resultant sheet is difficult to handle and exhibits a poor processability. The transparent sheet optionally contains an ultraviolet ray-absorbing agent, for example, hydroxybenzophenone compounds, such as 2-hydroxybenzophenone, 2,4-dihydroxybenzophenone and 2,2',4-trihydroxybenzophenone; and benzotriazole compounds such as (2-hydroxyphenyl) benzotriazole and (2-hydroxyphenyl-5-methylphenyl) benzotriazole, to enhance the light fastness of the printed pigment ink images.

The adhesive agent for the overlaminating sheet is preferably selected from hot melt (heat-seating) adhesive polymer materials and pressure-sensitive adhesive polymeric materials, the adhesive polymeric materials are selected from, for example, styrene-butadiene copolymers, acrylic polymers and copolymers and urethane polymers and copolymers, in consideration of the purpose of the over-laminating sheet.

In view of wide variety and low price or cost, the acrylic adhesive agents are preferably employed. The acrylic adhesive agents contains at least one acrylic polymer selected from, for example, copolymers of at least one acrylic monomer selected from ethylene acryl, methyl methacrylate, ethyl methacrylate, hydroxyethyl methacrylate, hydroxypropyl methacrylate and N-methylol acrylamine, with at least commoner selected from ethylene compounds and styrene compounds copolymerizable with the acrylic monomers.

EXAMPLES

The present invention will be further illustrated by the following examples which are merely representative and do not intend to restrict the scope of the present invention in any way.

Example 1

A pigment ink jet recording sheet was prepared by the following procedures.

(1) Preparation of an Undercoat Layer-coated Support Sheet

An coating liquid for an undercoat layer was prepared by mixing 60 parts by weight of a calcium carbonate pigment having a oil absorption of 60 ml/100 g (trademark: CAL-LITE SA, made by SHIRAISH CHUOKENKYUSHO) with 40 parts by weight of an aqueous emulsion of an acrylic resin having a glass transition temperature of 0° C. (trademark: AE-322, made by NIPPON GOSEIGOMU K.K.) further mixing the mixture into water while agitating to prepare a undercoat layer-coating liquid having a total content of 50%.

The coating liquid was coated on a surface of a support sheet consisting of a synthetic paper sheet having a thickness of 80 μm (trademark: YUPO FPG-80, made by OJI YUKA-GOSEISHI K.K.) composed of a multi-layered film having front and back paper-like layers formed from oriented polypropylene films containing an inorganic pigment, by using a bar coater, and the coated liquid layer was dried at a temperature of 110° C. to form a white-colored undercoat layer having a weight of 5.0 $g/m^2$ on the support sheet.

(2) Formation of a Lower Ink Receiving Layer

A coating liquid for a lower ink receiving layer was prepared by dissolving 20 parts by weight of polyvinyl alcohol (trademark: POLYVINYL ALCOHOL 117, made by K.K. KURARAY) in 400 parts by weight of water while agitating at a temperature of 90° C.; and mixing the polyvinyl alcohol solution with 40 parts by weight of amorphous synthetic silica particles having an average agglomerate particle size of 15.0 μm (trademark: NIPSIL RS-150, made by NIPPON SILICA KOGYO K.K.), 30 parts by weight of a vinyl acetate-ethylene copolymer latex (trademark: SUMIKAFLEX S-470, made by SUMITOMO KAGAKU KOGYO K.K.) and 10 parts by weight of polydiallyldimethyl, ammonium chloride (trademark: UNISENCE CP-103, made by K.K. SENCA), while agitating.

The coating liquid was coated in a dry amount of 8.0 g/m$^2$ on the undercoat layer formed on the support sheet by using a bar coater and the coated liquid layer was dried at a temperature of 110° C., to form a white-colored lower ink receiving layer was formed on the undercoat layer.

(3) Formation of an Upper Ink Receiving Layer

A coating liquid for an upper ink receiving layer was prepared by dissolving 30 parts by weight of a silanol-modified polyvinyl alcohol (trademark: R-1130, made by K.K. KURARAY) in 400 parts by weight of water at a temperature of 90° C., while agitating; and mixing the aqueous solution with 50 parts by weight of amorphous synthetic silica particles having an average particle size of 15.0 μm (trademark: NIPSIL RS-150, made by NIPPON SILICA KOGYO K.K.) 10 parts by weight of a vinyl acetate-ethylene copolymer latex (trademark: SUMIKAFLEX S-470, made by SUMITOMO KAGAKUKOGYO K.K.) and 10 parts by weight of a polydiallyldimethyl ammonium chloride (trademark: UNISENCE CP-103, made by K.K. SENCA), while agitating the mixture.

The coating liquid was coated in a dry amount of 10.0 g/m$^2$ on the lower ink receiving layer by a bar coater and the coated liquid layer was dried at a temperature of 110° C., to form a white-colored upper ink receiving layer on the lower ink receiving layer.

An ink jet recording sheet having a two layered composite ink receiving layer was obtained.

Example 2

An ink jet recording sheet was produced by the same procedures as in Example 1, with the following exceptions.

In the coating liquids for the lower and upper ink receiving layers, the amorphous synthetic silica particles (NIPSIL RS-150) were replaced by other amorphous synthetic silica particles having an average particle size of 11.0 μm (trademark: NIPSIL ER, made by NIPPON SILICA KOGYO K.K.).

Example 3

An ink jet recording sheet was produced by the same procedures as in Example 1, with the following exceptions.

In the coating liquids for the lower and upper ink receiving layers, the amorphous synthetic silica particles (NIPSIL RS-150) were replaced by other amorphous synthetic silica particles having an average particle size of 8.1 μm (trademark: CARPLEX #80, made by SHIONOGI SEIYAKU K.K.).

Example 4

An ink jet recording sheet was produced by the same procedures as in Example 1, with the following exceptions.

In the coating liquids for the lower and upper ink receiving layers, the amorphous synthetic silica particles (NIPSIL RS-150) were replaced by other amorphous synthetic silica particles having an average particle size of 7.0 μm (trademark: NIPSIL L300, made by NIPPON SILICA KOGYO K.K.).

Example 5

An ink jet recording sheet was produced by the same procedures as in Example 2, with the following exceptions.

In the coating liquid for the lower ink receiving layer, the amount of the vinyl acetate-ethylene copolymer latex (trademark: SUMIKAFLEX S-470, made by SUMITOMO KAGAKUKOGYO K.K.) was changed from 30 parts by weight to 15 parts by weight.

Example 6

An ink jet recording sheet was produced by the same procedures as in Example 2, with the following exceptions.

In the coating liquid for the lower ink receiving layer, the amount of the vinyl acetate-ethylene copolymer latex (trademark: SUMIKAFLEX S-470, made by SUMITOMO KAGAKUKOGYO K.K.) was changed from 30 parts by weight to 55 parts by weight.

Example 7

An ink jet recording sheet was produced by the same procedures as in Example 2, with the following exceptions.

In the coating liquid for the upper ink receiving layer, the amount of the vinyl acetate-ethylene copolymer latex (trademark: SUMIKAFLEX S-470, made by SUMITOMO KAGAKUKOGYO K.K.) was changed from 10 parts by weight to 7 parts by weight.

Example 8

An ink jet recording sheet was produced by the same procedures as in Example 2, with the following exceptions.

In the coating liquid for the upper ink receiving layer, the amount of the vinyl acetate-ethylene copolymer latex (trademark: SUMIKAFLEX S-470, made by SUMITOMO KAGAKUKOGYO K.K.) was changed from 10 parts by weight to 17 parts by weight.

Example 9

An ink jet recording sheet was produced by the same procedures as in Example 2, with the following exceptions.

In the coating liquid for the upper ink receiving layer, the amount of the silanol-modified polyvinyl alcohol (trademark: R-1130, made by KURARYR K.K.) was changed from 30 parts by weight to 25 parts by weight.

Example 10

An ink jet recording sheet was produced by the same procedures as in Example 2, with the following exceptions.

In the coating liquid for the upper ink receiving layer, the amount of the silanol-modified polyvinyl alcohol (trademark: R-1130, made by KURARYR K.K.) was changed from 30 parts by weight to 45 parts by weight.

Comparative Example 1

An ink jet recording sheet was produced by the same procedures as in Example 1, with the following exceptions.

In the coating liquids for the lower and upper ink receiving layers, the amorphous synthetic silica particles (NIPSIL RS-150) were replaced by other amorphous synthetic silica particles having an average particle size of 18.0 μm (trademark: NIPSIL VN3, made by NIPPON SILICA KOGYO K.K.).

Comparative Example 2

An ink jet recording sheet was produced by the same procedures as in Example 1, with the following exceptions.

In the coating liquids for the lower and upper ink receiving layers, the amorphous synthetic silica particles (NIPSIL RS-150) were replaced by other amorphous synthetic silica particles having an average particle size of 4.3 μm (trademark: FINESIL X-45, made by TOKUYAMA K.K.).

Comparative Example 3

An ink jet recording sheet was produced by the same procedures as in Example 1, with the following exceptions.

In the coating liquids for the lower and upper ink receiving layers, the amorphous synthetic silica particles (NIPSIL RS-150) were replaced by other amorphous synthetic silica particles having an average particle size of 2.5 μm (trademark: FINESIL X-80, made by TOKUYAMA K.K.).

Example 11

An ink jet recording sheet was produced by the same procedures as in Example 2, with the following exceptions.

In the coating liquid for the lower ink receiving layer, the amount of the vinyl acetate-ethylene copolymer latex (trademark: SUMIKAFLEX S-470, made by SUMITOMO KAGAKUKOGYO K.K.) was changed from 30 parts by weight to 15 parts by weight.

Example 12

An ink jet recording sheet was produced by the same procedures as in Example 2, with the following exceptions.

In the coating liquid for the lower ink receiving layer, the amount of the vinyl acetate-ethylene copolymer latex (trademark: SUMIKAFLEX S-470, made by SUMITOMO KAGAKUKOGYO K.K.) was changed from 30 parts by weight to 85 parts by weight.

Example 13

An ink jet recording sheet was produced by the same procedures as in Example 2, with the following exceptions.

In the coating liquid for the upper ink receiving layer, the amount of the vinyl acetate-ethylene copolymer latex (trademark: SUMIKAFLEX S-470, made by SUMITOMO KAGAKUKOGYO K.K.) was changed from 10 parts by weight to 3 parts by weight.

Example 14

An ink jet recording sheet was produced by the same procedures as in Example 2, with the following exceptions.

In the coating liquids for the upper ink receiving layer, the amount of the vinyl acetate-ethylene copolymer latex (trademark: SUMIKAFLEX S-470, made by SUMITOMO KAGAKUKOGYO K.K.) was changed from 10 parts by weight to 25 parts by weight.

Example 15

An ink jet recording sheet was produced by the same procedures as in Example 2, with the following exceptions.

In the coating liquid for the upper ink receiving layer, the amount of the silanol-modified polyvinyl alcohol (trademark: R-1130, made by KURARYR K.K.) was changed from 30 parts by weight to 15 parts by weight.

Example 16

An ink jet recording sheet was produced by the same procedures as in Example 2, with the following exceptions.

In the coating liquid for the upper ink receiving layer, the amount of the silanol-modified polyvinyl alcohol (trademark: R-1130, made by KURARYR K.K.) was changed from 30 parts by weight to 55 parts by weight.

Comparative Example 4

An ink jet recording sheet was produced by the same procedures as in Example 2, with the following exceptions.

In the coating liquid for the lower ink receiving layer, the vinyl acetate-ethylene copolymer latex was not contained.

Comparative Example 5

An ink jet recording sheet was produced by the same procedures as in Example 2, with the following exceptions.

In the coating liquid for the upper ink receiving layer, the vinyl acetate-ethylene copolymer latex was not contained.

Comparative Example 6

An ink jet recording sheet was produced by the same procedures as in Example 2, with the following exceptions.

In the coating liquid for the upper ink receiving layer, the silanol-modified polyvinyl alcohol was not contained.

TESTS

The pigment ink jet recording sheets of Examples 1 to 16 and Comparative Examples 1 to 6 were subjected to the following tests of Bekk smoothness, rubbing resistance of images, image quality, rubbing resistance of coatings, water resistance of coatings, blotting resistance of images and color density of images.

(1) Bekk Smoothness

A smoothness of the outermost layer surface, i.e. the upper ink receiving layer surface, of the ink jet recording sheet was measured in accordance with JIS P 8119 using a Bekk smoothness tester.

(2) Rubbing Strength of Images

The ink jet recording sheet was printed with black-colored (100%) images by an ink jet plotter (Design Jet 2500CP, made by Hewlett Packard Co.) using UV ink (coloring pigment ink made by Hewlett Packard Co.) and one hour after the printing operation, the black colored image portion of the recording sheet was rubbed with a cotton applicator, and the removal of the black colored images from the ink receiving layer surface was observed by the naked eye and evaluated into the following four classes.

| Class | Rubbing resistance |
|---|---|
| 4 | No removal of colored images was found. |
| 3 | Substantially no removal of colored images was found. |
| 2 | Slight removal of inks was found. |
| 1 | Significant removal of inks was found. |

(3) Image Quality

On the recording surface of the ink jet recording sheet, an image sample N1 (portrait) of high definition color digital standard image data (ISO/JIS-CID) published by NIPPON KIKAKU KYOKAI (Japanese Standards Association), by an ink jet plotter (Design Jet 2500CP, made by Hewlett Packard Co.) using UV inks (coloring pigment ink made by Hewlett Packard Co.), and the definition of the printed images were observed by the naked eye and evaluated into the following four classes.

| Class | Image quality |
|---|---|
| 4 | The skin color of the portrait was reproduced. Excellent |
| 3 | The skin color of the portrait was substantially reproduced. Good |
| 2 | The skin color of the portrait was insufficiently reproduced. Unsatisfactory |
| 1 | The skin color of the portrait was not reproduced. Bad |

(4) Rubbing Strength of Coating

The surface of the coating layer of the ink jet recording sheet was rubbed 20 times with a cotton applicator, and the conditions of the rubbed surface were observed by the naked eye and evaluated in the following four classes.

| Class | Rubbing resistance |
|---|---|
| 4 | No removal was found on the coating surface. Excellent |
| 3 | Substantially no removal was found on the coating surface. Good |
| 2 | The coating surface was slightly removed. Satisfactory in practice |
| 1 | The coating was removed. Bad |

(5) Water Resistance of Coatings

A specimen of the ink jet recording sheet was imersed in water at room temperature for a time of one hour, and the ink receiving layer surface of the specimen was rubbed 20 times with a cotton applicator. The conditions of the rubbed surfaces of the specimen were observed by the naked eye and evaluated into the following four classes.

| Class | Water resistance |
|---|---|
| 4 | No removal was found on the coating surface. Excellent |
| 3 | The coating surface was slightly removed. Good |
| 2 | The coating surface was partially removed. Satisfactory in practice |
| 1 | The coating surface was significantly removed. Bad |

(6) Blotting Resistance of Ink Images

200% colored images formed by superposing 100% cyan-coloring pigment ink images and 100% magenta-coloring pigment ink images on each other, which inks are selected from UV inks made by Hewlett Packard Co., were formed on a recording surface of the ink jet recording sheet, using an ink jet plotter (Design Jet 2500CP, made by Hewlett Packard Co.). After printing, the blotting of the superposed pigment inks was observed by the naked eye and evaluated into the following four classes.

| Class | Ink-blotting |
|---|---|
| 4 | No blotting was found. |
| 3 | Slight blotting was found. |
| 2 | Practically allowable blotting was formed. |
| 1 | Significant blotting was found. |

(7) Color Density of Ink Images

On a recording surface of the ink jet recording sheet, 100% black-colored images were printed with an UV ink (a coloring pigment ink made by Hewlett Packard Co.), by using an ink jet plotter (Design Jet 2500CP, made by Hewlett Packard Co.). The color density of the printed images was measured by a Macbeth color density meter (Model: RD-914, made by Macbeth Co.).

The test results are shown in Table 1.

TABLE 1

| Example No. | | Item: Average particle size of silica in lower and upper layers (μm) | Amount: Water-insoluble resin in lower layer (Wt part) | Amount: Silanol-modified PVA in upper layer (Wt part) | Amount: Water-insoluble resin in upper layer (Wt part) | Bekk smoothness (sec) | Rubbing resistance of images | Image quality | Rubbing resistance of coating | Water-resistance of coating | Blotting resistance of images | Color density |
|---|---|---|---|---|---|---|---|---|---|---|---|---|
| Example | 1 | 15.0 | 30 | 30 | 10 | 6 | 4 | 4 | 4 | 4 | 4 | 1.62 |
| | 2 | 11.0 | 30 | 30 | 10 | 9 | 4 | 4 | 4 | 4 | 4 | 1.61 |
| | 3 | 8.1 | 30 | 30 | 10 | 14 | 3 | 4 | 4 | 4 | 4 | 1.60 |
| | 4 | 7.0 | 30 | 30 | 10 | 30 | 3 | 4 | 4 | 4 | 4 | 1.60 |
| | 5 | 11.0 | 15 | 30 | 10 | 12 | 4 | 4 | 4 | 3 | 4 | 1.60 |
| | 6 | 11.0 | 55 | 30 | 10 | 17 | 3 | 4 | 4 | 4 | 4 | 1.60 |
| | 7 | 11.0 | 30 | 30 | 7 | 13 | 4 | 4 | 4 | 3 | 4 | 1.61 |
| | 8 | 11.0 | 30 | 30 | 17 | 15 | 4 | 4 | 4 | 4 | 4 | 1.52 |

TABLE 1-continued

| Example No. | | Average particle size of silica in lower and upper layers (μm) | Amount: Water-insoluble resin in lower layer (Wt part) | Amount: Silanol-modified PVA in upper layer (Wt part) | Amount: Water-insoluble resin in upper layer (Wt part) | Bekk smoothness (sec) | Rubbing resistance of images | Image quality | Rubbing resistance of coating | Water-resistance of coating | Blotting resistance of images | Color density |
|---|---|---|---|---|---|---|---|---|---|---|---|---|
| | 9 | 11.0 | 30 | 25 | 10 | 12 | 4 | 4 | 4 | 4 | 4 | 1.55 |
| | 10 | 11.0 | 30 | 45 | 10 | 16 | 3 | 4 | 4 | 4 | 3 | 1.65 |
| Comparative | 1 | 18.0 | 30 | 30 | 10 | 3 | 4 | 2 | 4 | 4 | 4 | 1.63 |
| Example | 2 | 4.3 | 30 | 30 | 10 | 50 | 2 | 4 | 4 | 4 | 4 | 1.59 |
| | 3 | 2.5 | 30 | 30 | 10 | 160 | 1 | 4 | 4 | 4 | 4 | 1.57 |
| Example | 11 | 11.0 | 15 | 30 | 10 | 10 | 4 | 4 | 3 | 2 | 4 | 1.60 |
| | 12 | 11.0 | 85 | 30 | 10 | 20 | 3 | 4 | 4 | 4 | 2 | 1.61 |
| | 13 | 11.0 | 30 | 30 | 3 | 7 | 4 | 4 | 3 | 2 | 4 | 1.60 |
| | 14 | 11.0 | 30 | 30 | 25 | 20 | 3 | 4 | 4 | 4 | 2 | 1.63 |
| | 15 | 11.0 | 30 | 15 | 10 | 12 | 4 | 4 | 2 | 3 | 4 | 1.60 |
| | 16 | 11.0 | 30 | 55 | 10 | 19 | 3 | 4 | 4 | 4 | 2 | 1.60 |
| Comparative | 4 | 11.0 | 00 | 30 | 10 | 9 | 4 | 4 | 1 | 1 | 4 | 1.61 |
| Example | 5 | 11.0 | 30 | 30 | 00 | 10 | 4 | 4 | 2 | 1 | 4 | 1.60 |
| | 6 | 11.0 | 30 | 00 | 10 | 11 | 4 | 4 | 1 | 2 | 4 | 1.60 |

Example 17

An ink jet recording sheet was produced by the same procedures as in Example 3, with the following exceptions.

After printing the recording surface of the resultant ink jet recording sheet with 200% colored images with an UV ink (which was a pigment ink made by Hewlett Packard Co.) by using an ink jet plotter (Design Jet 2500CP, made by Hewlett Packard Co.), the printed surface was overlaminated with a transparent polyvinyl chloride film having a thickness of 80 μm through an acrylic resin adhesive layer.

The same tests were applied to the resultant printed and overlaminated sheet. The test results are shown in Table 2.

Example 18

A ink jet recording sheet was produced by the same procedures as in Example 3, with the following exceptions.

After printing the recording surface of the resultant ink jet recording sheet with 200% colored images with an UV ink (which was a pigment ink made by Hewlett Packard Co.) by using an ink jet plotter (Design Jet 2500CP, made by Hewlett Packard Co.), the printed surface was overlaminated with a transparent polyvinyl chloride film containing an ultraviolet ray-absorber and having a thickness of 80 μm through an acrylic resin adhesive layer.

The same tests were applied to the resultant printed and overlaminated sheet. The test results are shown in Table 2.

Example 19

An ink jet recording sheet was produced by the same procedures as in Example 3, with the following exceptions.

After printing the recording surface of the resultant ink jet recording sheet with 200% colored images with an UV ink (which was a pigment ink made by Hewlett Packard Co.) by using an ink jet plotter (Design Jet 2500CP, made by Hewlett Packard Co.), the printed surface was overlaminated with a transparent polyester film containing an ultraviolet ray-absorber and having a thickness of 50 μm through an acrylic resin adhesive layer.

The same tests were applied to the resultant printed and overlaminated sheet. The test results are shown in Table 2.

Comparative Example 7

An ink jet recording sheet was produced by the same procedures as in Comparative Example 4, with the following exceptions.

After printing the recording surface of the resultant ink jet recording sheet with 200% colored images with an UV ink (which was a pigment ink made by Hewlett Packard Co.) by using an ink jet plotter (Design Jet 2500CP, made by Hewlett Packard Co.), the printed surface was overlaminated with a transparent polyester film containing an ultraviolet ray-absorber and having a thickness of 50 μm through an acrylic resin adhesive layer.

The same tests were applied to the resultant printed and overlaminated sheet. The test results are shown in Table 2.

TABLE 2

| Item | Example 7: Example 17 | Example 18 | Example 19 | Comparative Example 7 |
|---|---|---|---|---|
| Bekk smoothness of ink-recording layer (sec) | 14 | 14 | 14 | 9 |
| Bekk smoothness of over-laminate layer (sec) | 250 | 250 | 300 | 300 |
| Rubbing resistance of images | 4 | 4 | 4 | 4 |
| Quality of images | 4 | 4 | 4 | 4 |
| Rubbing strength of over-laminating layer | 4 | 4 | 4 | 4 |
| Water resistance of coatings and overlaminating layer | 4 | 4 | 4 | 1 |
| Resistance of images to blotting | 4 | 4 | 4 | 4 |
| Color density of images | 1.63 | 1.63 | 1.63 | 1.65 |

The pigment ink jet recording sheet of the present invention exhibits excellent rubbing resistance and quality (definition) of pigment images, rubbing resistance and water resistance of ink receiving layer, resistance of pigment images to blotting, color density of pigment images and surface strength.

Since the pigment ink jet recording sheet of the present invention is advantageous not only in the excellent image quality, coating layer strength, coating layer water resistance, resistance to image blotting, image color density and surface strength, but also in the rubbing strength of the pigment ink jet-recorded images, the pigment ink images received on the recording surface of the ink receiving layer exhibit a high resistance to rubbing and thus are resistant to rough handling of the recording sheet.

What is claimed is:

1. An ink jet recording sheet for ink jet recording using pigment ink, said ink jet recording sheet comprising:

(A) a support sheet comprising a polymeric film;

(B) a lower ink receiving layer formed on the support sheet and comprising amorphous synthetic silica particles and a water-insoluble polymeric material, and (C) an upper ink receiving layer formed on the lower ink receiving layer and comprising amorphous synthetic silica particles, a water-insoluble polymeric material and a silanol-modified polyvinyl alcohol, wherein the amorphous synthetic silica particles contained in the upper ink receiving layer have an average particle size of 6 to 16 μm, and the upper ink receiving layer exhibits a Bekk smoothness of 5 to 40 seconds, determined in accordance with Japanese Industrial Standard P 8119-1976.

2. The ink jet recording sheet as claimed in claim 1, wherein in the lower ink receiving layer, the water-insoluble polymeric material is present in an amount of 20 to 50 parts by weight per 100 parts by weight of the total weight of the lower ink receiving layer; and in the upper ink receiving layer, the water-insoluble polymeric material is present in an amount of 5 to 20 parts by weight and the silanol-modified polyvinyl alcohol is present in an amount of 10 to 40 parts by weight, each per 100 parts by weight of the total amount of the upper ink receiving layer.

3. The ink jet recording sheet as claimed in claim 1 or 2, wherein the upper ink receiving layer further comprises a cationic polymeric material.

4. The ink jet recording sheet as claimed in claim 1, wherein an undercoat layer comprising a pigment and a water-insoluble polymeric material is formed between the support sheet and the lower ink receiving layer.

5. The ink jet recording sheet as claimed in claim 1, wherein the Bekk smoothness of the upper ink receiving layer is in the range of from 5 to 15 seconds.

6. The ink jet recording sheet as claimed in claim 1, wherein the water-insoluble polymeric material comprises at least one member selected from the group consisting of latices of conjugated diene polymers and copolymers, latices of acrylic acid ester polymers and copolymers and latices of vinyl compound polymers and copolymers.

* * * * *